United States Patent [19]

Böttcher

[11] Patent Number: 5,169,482
[45] Date of Patent: Dec. 8, 1992

[54] GRIPPING AND TRANSPORTING APPARATUS FOR A FLEXIBLE COMPONENT THAT IS TO BE SUPPLIED TO A CURVED APPARATUS

[75] Inventor: Harry Böttcher, Korbach, Fed. Rep. of Germany

[73] Assignee: Continental Aktiengesellschaft, Hanover, Fed. Rep. of Germany

[21] Appl. No.: 660,567

[22] Filed: Feb. 21, 1991

[30] Foreign Application Priority Data

Feb. 21, 1990 [DE] Fed. Rep. of Germany ....... 4005401

[51] Int. Cl.⁵ .............................................. B29D 30/30
[52] U.S. Cl. .................................. 156/405.1; 156/123; 156/493
[58] Field of Search ............ 156/123, 130, 133, 405.1, 156/406.4, 538, 558, DIG. 31, 493; 271/94, 95, 106; 198/803.5, 471.1; 269/21; 414/737, 793, 793.1, 797; 294/64.1; 279/3

[56] References Cited

U.S. PATENT DOCUMENTS

| | | | |
|---|---|---|---|
| 4,132,583 | 1/1979 | Hodgson | 156/493 X |
| 4,595,447 | 6/1986 | Lindstrom | 156/DIG. 31 |
| 4,824,515 | 4/1989 | Still et al. | 156/406.4 |
| 4,931,341 | 6/1990 | Haffer et al. | 294/64.1 X |

Primary Examiner—Geoffrey L. Knable
Attorney, Agent, or Firm—Robert W. Becker & Associates

[57] ABSTRACT

An apparatus for supplying a flexible component onto a curved apparatus for subsequent treatment is provided, for example for supplying a bandage-like reinforcing insert onto a tire buildup drum. A vacuum hose, to which a vacuum can be supplied, is provided for gripping the flexible component. Lifting cylinders are provided for raising and lowering the vacuum hose. Guides are provided for the adjustment of the lifting cylinders relative to the curved apparatus for subsequent treatment.

11 Claims, 6 Drawing Sheets

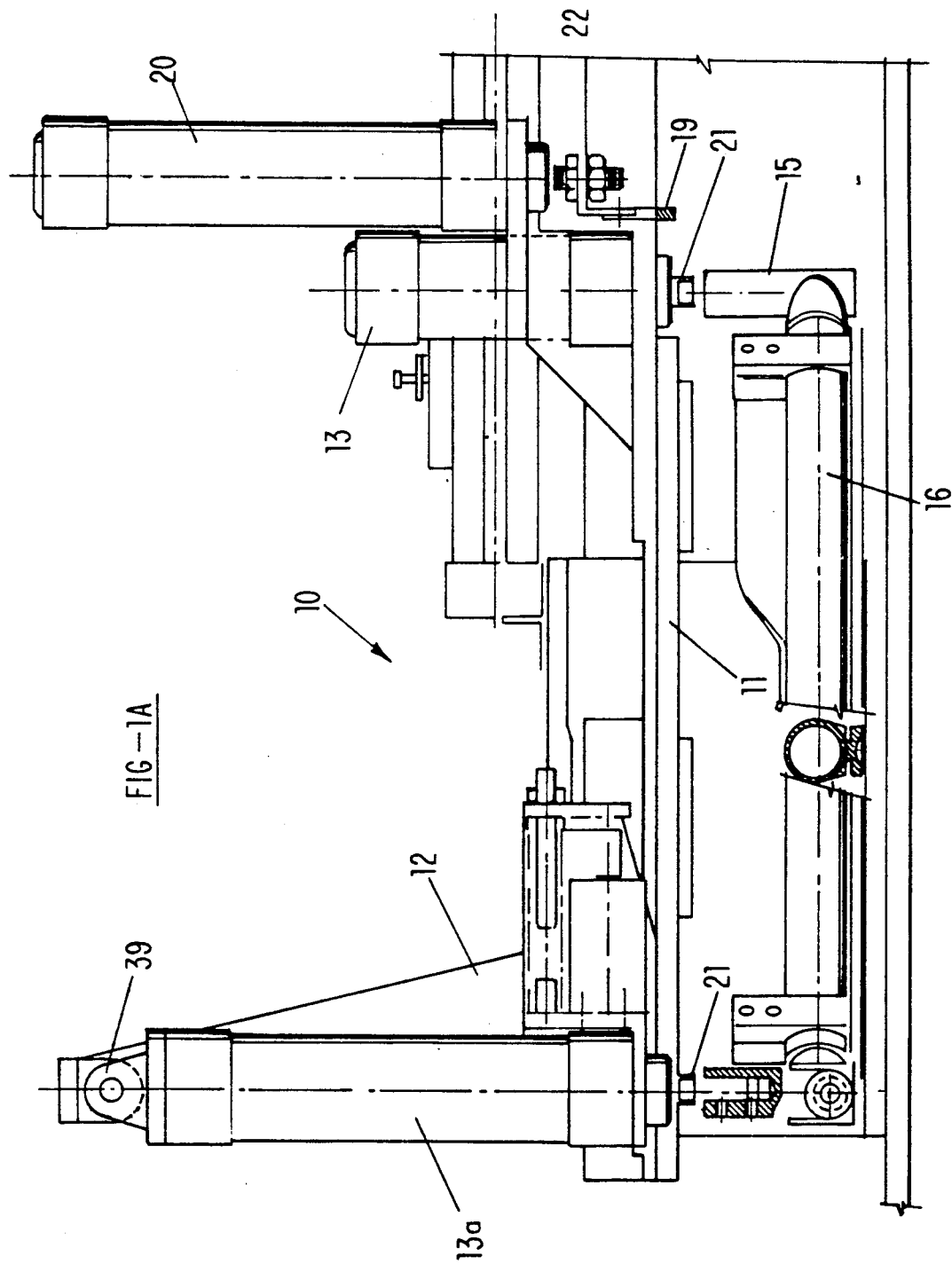

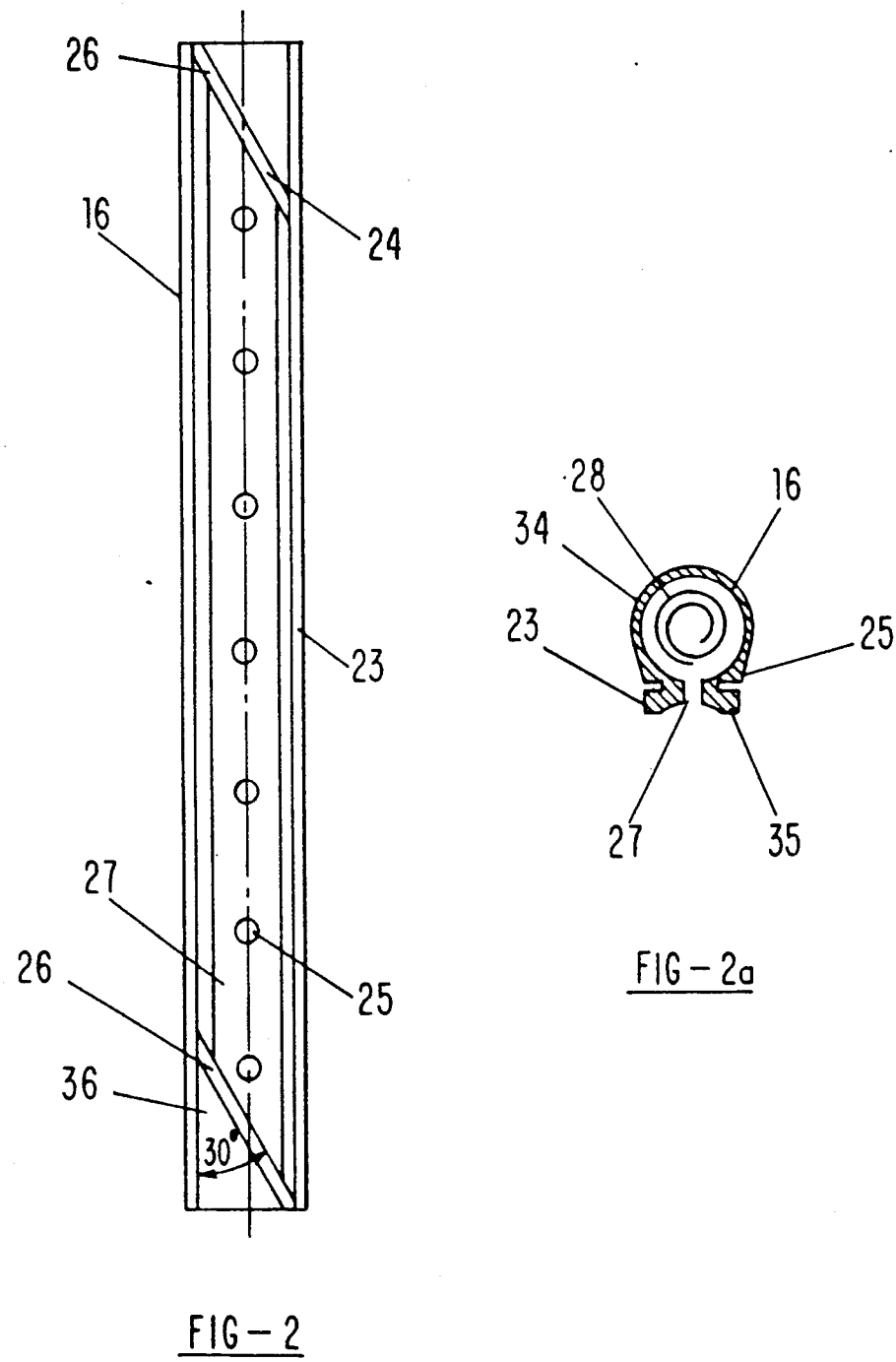

GRIPPING AND TRANSPORTING APPARATUS FOR A FLEXIBLE COMPONENT THAT IS TO BE SUPPLIED TO A CURVED APPARATUS

BACKGROUND OF THE INVENTION

The present invention relates to an apparatus for supplying a flexible component onto a curved apparatus for subsequent treatment, for example for supplying a bandage-like reinforcing means onto a tire build-up drum.

During the build-up of pneumatic vehicle tires, the individual plies, reinforcing means, tread strip, etc. are predominately manually supplied to a tire build-up drum, are placed thereon, and are cut to the respectively required material length via a special cutter. These cut edges customarily extend at an acute angle relative to the longitudinal axis of the sheet of material in order to achieve an even and gradual transition at the joined-together abutment edges. In order to be able to bring the abutment edges together exactly, visual markings are provided that have to be observed by the operating personnel. A uniform build-up of tires thus depends upon the carefulness of operating personnel and upon the precision of visual aids. Since the carefulness and attentiveness of a person fluctuates during a working day, sources of error cannot be precluded, and each tire requires careful inspection after production.

After having been cut to length, the remaining ends are manually followed, are smoothed, and the overlapping is manually corrected. Only after all of this has been accomplished can the apparatus for placing a tread strip be moved beneath the tire build-up drum in order to be able to automatically place the tread strip thereon.

It is an object of the present invention to provide an apparatus with which precut, flexible components can be automatically gripped and can be supplied to a curved apparatus for subsequent treatment.

BRIEF DESCRIPTION OF THE DRAWINGS

This object, and other objects and advantages of the present invention, will appear more clearly from the following specification in conjunction with the accompanying schematic drawings, in which:

FIG. 1a is a side view of the apparatus of FIG. 1 with a vacuum hose placed upon a vacuum connection;

FIG. 2 is a detailed view of a vacuum hose that ca be lowered with the apparatus of FIG. 1;

FIG. 2a i s a cross-sectional view through the vacuum hose of FIG. 2;

SUMMARY OF THE INVENTION

The apparatus of the present invention is characterized primarily by: A vacuum hose, to which a vacuum can be supplied for gripping the flexible component; lifting cylinder means for raising and lowering the vacuum hose; and guide means for the adjustment of the lifting cylinder means relative to the curved apparatus for subsequent treatment. With these measures, an apparatus is provided with which, for example, a bandage-like reinforcing means that has been cut off at an acute angle can be uniformly gripped over the entire length of its cut edge, can be placed over the curvature of a tire build-up drum, and can be smoothed.

In order to be able to press the supplied bandage-like reinforcing means against the drum, one of the lifting cylinders has associated therewith a pressing brush that can be raised and lowered relative to the component that is being supplied via a further lifting cylinder.

Further specific features of the present invention will be described in detail subsequently.

DESCRIPTION OF PREFERRED EMBODIMENTS

Figure 1:
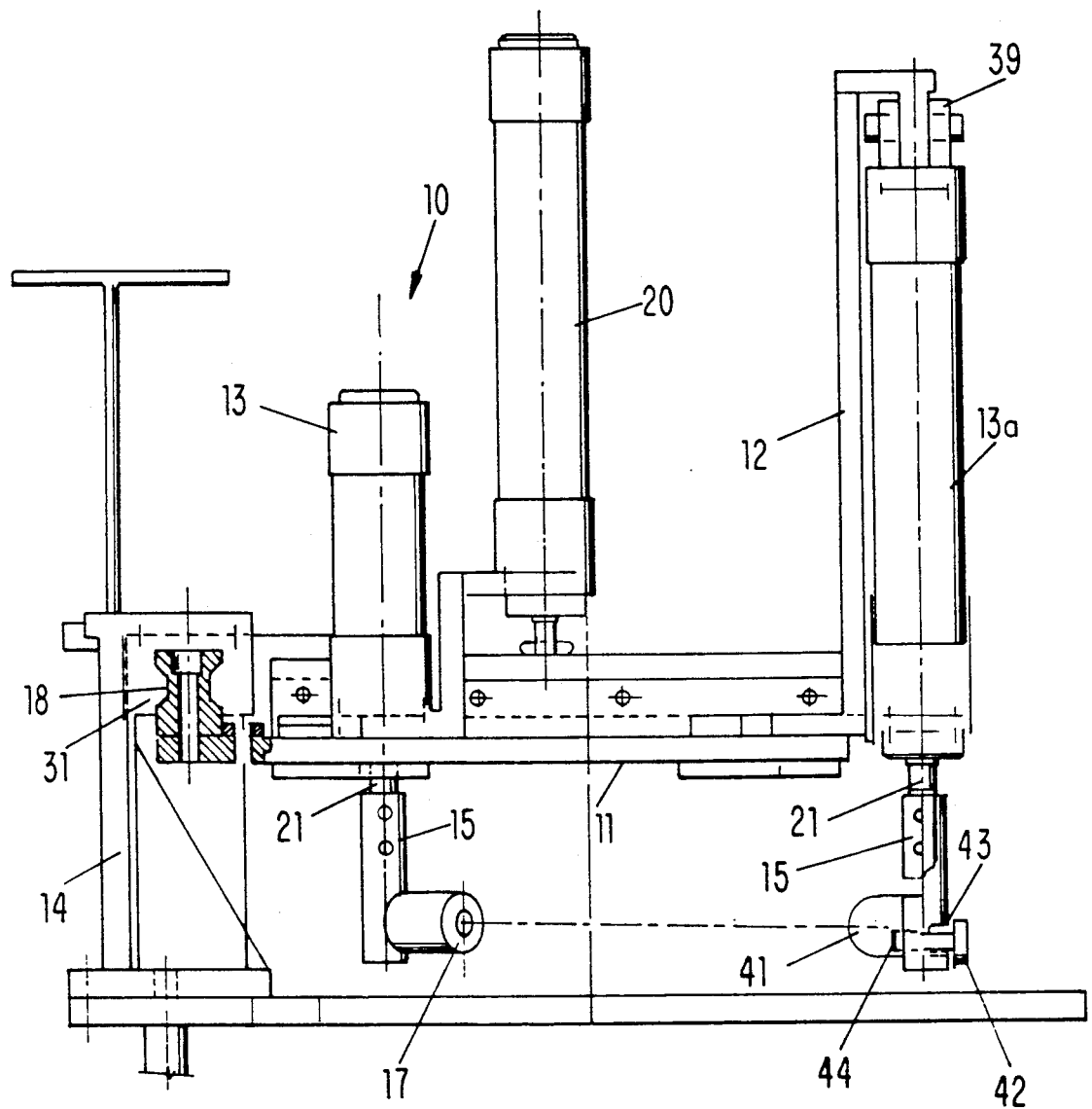
FIG. 1 is a front view of one exemplary embodiment of an inventive apparatus for supplying a bandage-like reinforcing means to a tire build-up drum.

Referring now to the drawings in detail, the gripping and transporting apparatus 10 illustrated in FIGS. 1 and 2 essentially comprises a support plate 11 for interconnecting a lifting cylinder 13 and a second lifting cylinder 13a that is secured to a holder 12. The lifting cylinders 13 and 13a are connected with mounting supports 15 via posts 21 that can be retracted and extended, and hence can be raised and lowered. Extending between the mounting supports 15 is a flexible vacuum hose 16 that, as shown in FIG. 1a, is placed upon vacuum connections 17. The support plate 11 is connected to a guide rail 18, which is guided in a guide block 31 that in turn is held by a support means 14. The guide rail 18 is disposed longitudinally, so that the entire gripping and transporting apparatus 10 can be shifted longitudinally.

The lifting cylinders 13 and 13a are adjustable within the support plate 11 in a direction parallel to the section direction in order to be able to utilize different lengths of flexible vacuum hose 16 at different material widths and the resulting different lengths of cut and hence different positions of the ends 30a of the bandage-like reinforcing means 30. The lifting cylinder 13a is furthermore pivotably mounted in a support means 39. Consequently, when the bandage-like reinforcing means 30 is placed upon a tire build-up drum 29, the necessary pivoting of the end 30a of the reinforcing means 30 is achieved.

In so doing, the front, pointed end of the bandage-like reinforcing means 30 is held in a particularly advantageous manner by the vacuum hose 16. It is furthermore advantageous for the lifting cylinder 13a to be pivotable against a non-illustrated spring element. During follow-up, the vacuum hose 16 is stretched in such a way that the gripped cut length remains unchanged.

The compensating movement of that end of the vacuum hose 16 that is placed upon the post 21 of the lifting cylinder 13a is made possible by providing a swivel element 41 that receives the hose and is pivotably secured on the mounting support 15 via a screw 42 that extends through a spacer 43 and engages a threaded hole 44 of the swivel element 41. At the other end, the vacuum hose 16 is placed upon a vacuum connection 17 so that a vacuum can be generated in the hose. As can be seen in the detailed views of FIGS. 2 and 2a, the vacuum hose 16 has a hollow space 34 in which is disposed a spiral spring 28. On one side, the vacuum hose 16 is provided with a vacuum strip 23 that has an inwardly curved, longitudinally extending suction chamber 27.

The two ends of the suction chamber 27 are closed off by sealing strips 26, which have the same height as the vacuum strip 23, thus providing a planar gripping surface 35. Provided between the suction chamber 27 and the hollow space 34 of the hose are a plurality of holes 25 for conveying a vacuum that has been introduced via the vacuum connection 17. The ends of the suction chamber 27 are provided with chamfers 24 that extend at a predetermined angle 36, which corresponds to the angles of cut that result when a flexible component, for example a bandage-like reinforcing means for a tire, that is to be supplied to the apparatus is cut to length.

Figure 3:
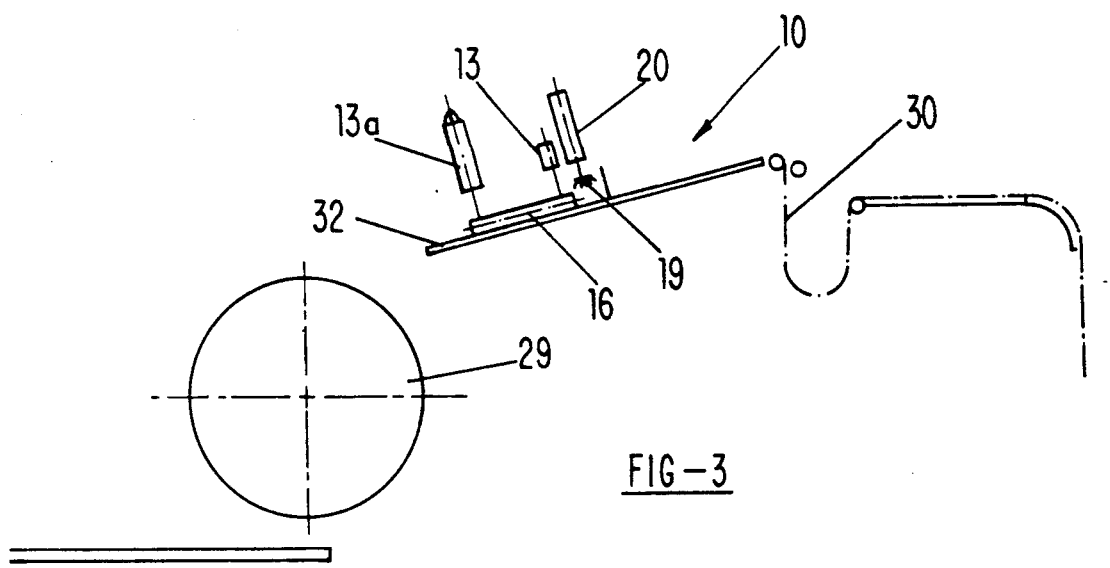
FIG. 3 shows the starting position of an apparatus for supplying a flexible, endless component onto a tire build-up drum.
Figure 4:
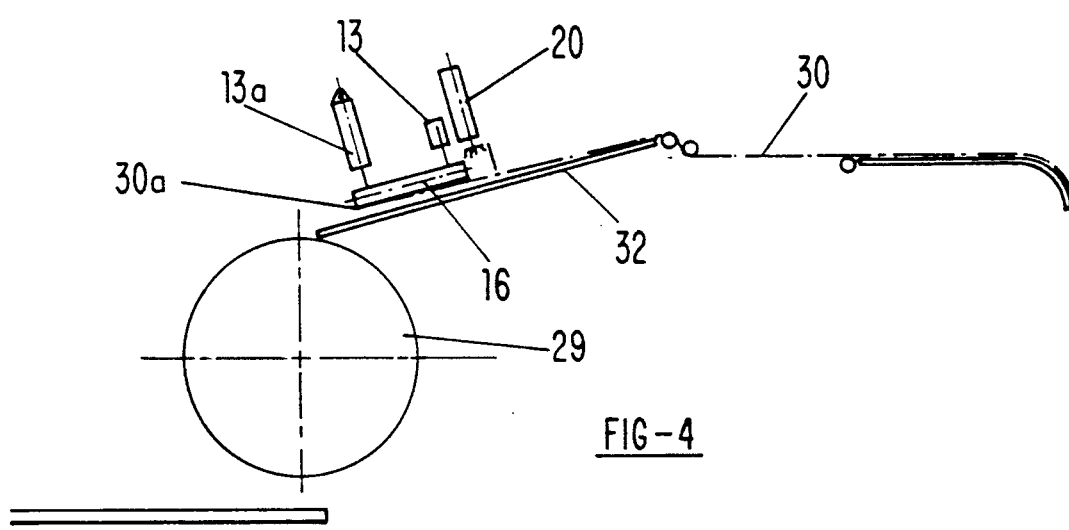
FIG. 4 shows the apparatus of FIG. 3 with a feed table that can be moved to the tire build-up drum and with the beginning of a bandage-like reinforcing means being gripped by the vacuum hose.

As shown in FIG. 3, with the previously described gripping and transporting apparatus 10, a quasi continuously fed flexible component, for example a bandage-like reinforcing means 30 for a tire, can be supplied to a curved apparatus for subsequent treatment, for example to a tire buildup drum 29. In so doing, the bandage-like reinforcing means 30 is placed upon a feed table 32 which, as shown in FIG. 4, is moved to the tire build-up drum 29.

Figure 5:
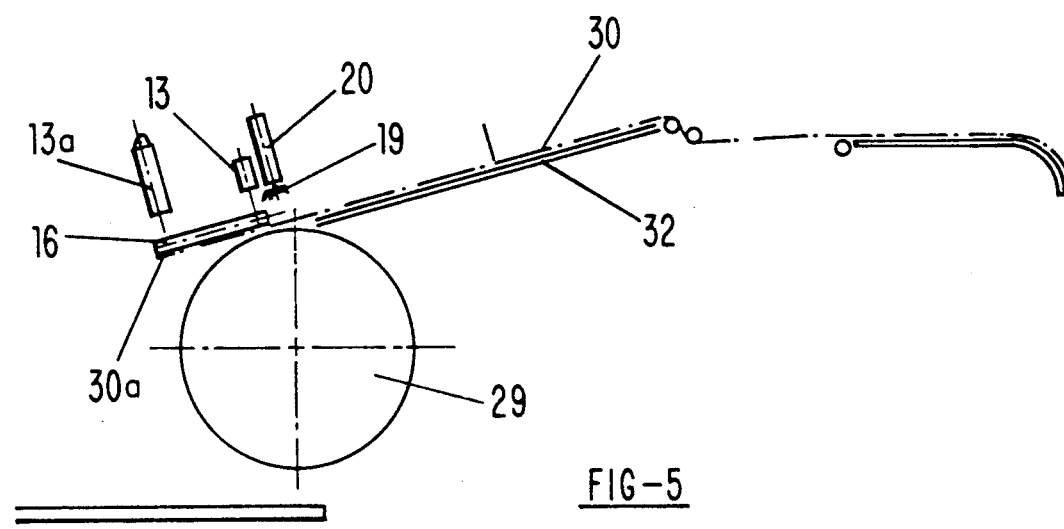
FIG. 5 shows the apparatus of FIG. 3 with the bandage-like reinforcing means being guided over the build-up drum via the vacuum hose.

In order to achieve a smooth transition at the cut edges between the beginning and the end of the bandage-like reinforcing means, the beginning of the reinforcing means is first cut at a predetermined angle 36 that corresponds to the angle of the chamfer 24 at the vacuum hose 16. This chamfered end 30a of the bandage-like reinforcing means 30 is gripped along its cut edge by the vacuum hose 16 when a vacuum is being pulled via the vacuum connection 17. With the aid of the lifting cylinders 13 and 13a, the bandage-like reinforcing means 30 is then raised from the feed table 32 and, as shown in FIG. 5, is pulled over the tire build-up drum 29.

Figure 6:
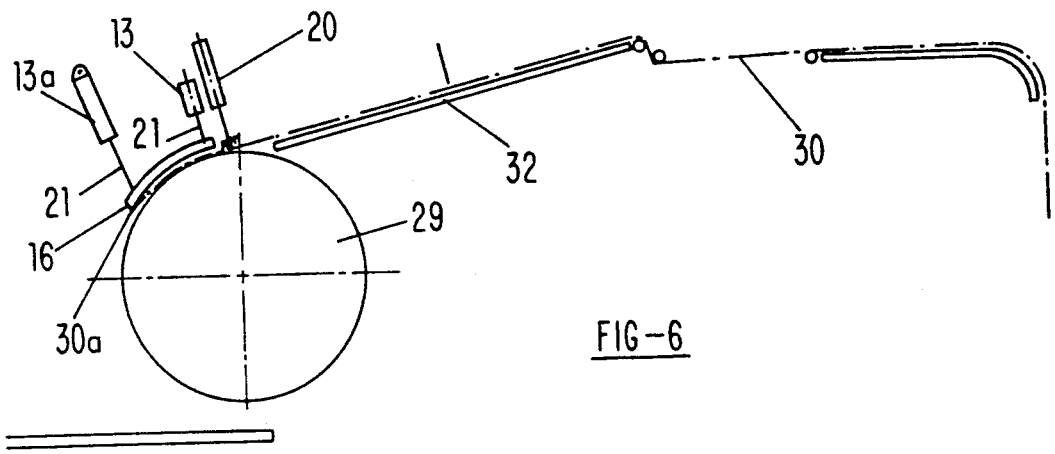
FIG. 6 shows the apparatus of FIGS. 3 to 5 during placement of the end of the bandage-like reinforcing means upon the drum via the vacuum hose.

As shown in FIG. 6, by varying lowering of the post 21 and pivoting of the lifting cylinder 13a, the end 30a of the bandage-like reinforcing means 30 can, via the flexible vacuum hose 16, be placed against the curved surface of the tire build-up drum 29. By means of the inserted spiral spring 28, the vacuum hose 16 itself retains its shape and can follow the radius of curvature of the tire build-up drum 29 without having to fear a loss of vacuum due to unintentional lifting-off of the vacuum strips 23 or the sealing strips 26. The posts 21 can be extended to different lengths, so that the vacuum hose 16 can stretch to conform to and follow the surface of the tire build-up drum 29.

Figure 7:
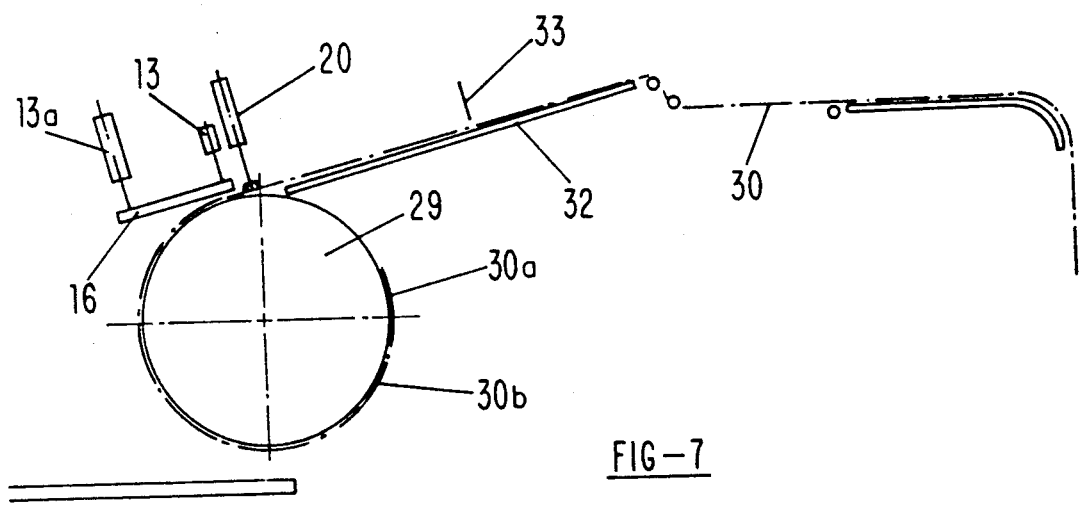
FIG. 7 shows the apparatus of FIG. 3 while the endless bandage-like reinforcing means is being placed upon the drum.

As shown in FIGS. 1 and 1a, the gripping and transporting apparatus 10 is also provided with a further lifting cylinder 20 via which a pressing brush 19 can be lowered against the tire build-up drum 29. By means of the pressing brush 19, the already built-up bandage-like reinforcing means 30b is pressed against the drum and smoothed, as shown in FIG. 7. For this purpose, the pressing brush 19 is moved up and down with a brush post 22 that is operated by the lifting cylinder 20.

Figure 8:
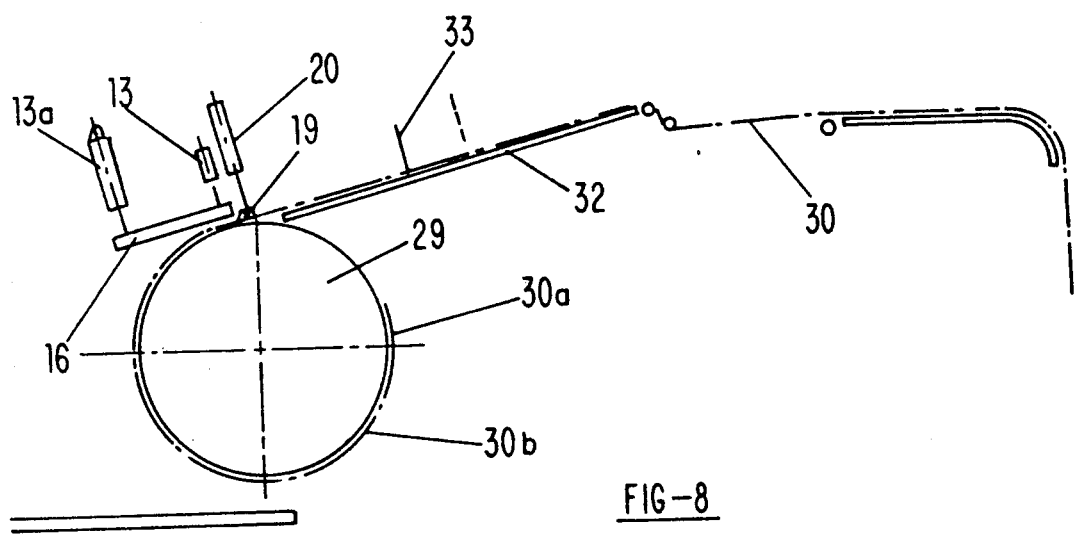
FIG. 8 shows the apparatus of FIG. 3 while the bandage-like reinforcing means that has been placed upon the tire build-up drum is being cut to length.

As shown in FIG. 8, associated with the feed table 32 is a cutter or blade 33 by means of which the bandage-like reinforcing means 30 that is to be placed upon the tire build-up drum 29 is cut to the respectively required length. The cutting to length is effected when the bandage-like reinforcing means 30 rest upon approximately ⅔ of the periphery of the tire build-up drum 29; the cutting is effected at a predetermined cutting angle 36 that corresponds to the angle of the chamfer 24 of the vacuum hose 16.

Figure 9:
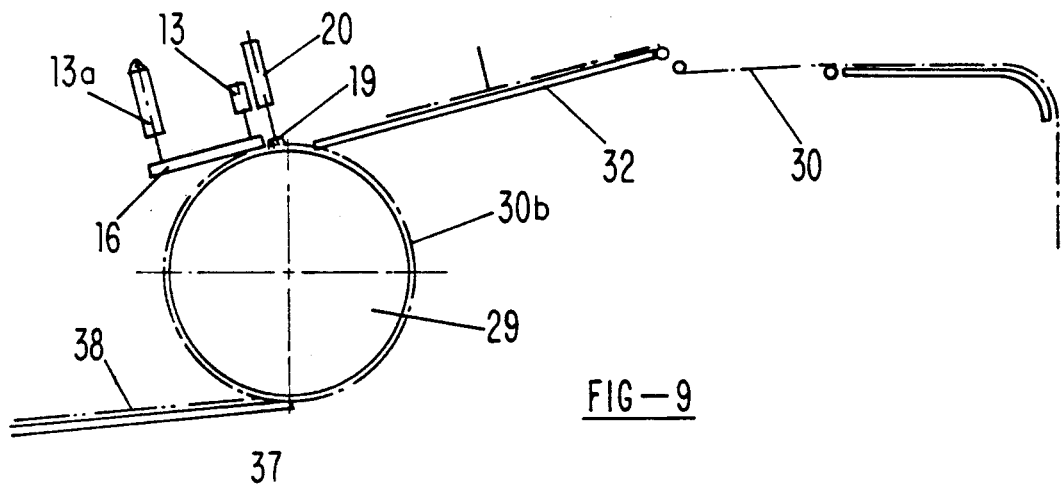
FIG. 9 shows the apparatus of FIG. 3 during the placement of a tread strip upon the bandage-like reinforcing means via a tread placement apparatus.

As shown in FIG. 9, after the flexible, bandage-like reinforcing means 30 has been placed upon the drum, smoothed, and cut to length, a tread strip 38 is moved against the tire build-up drum 29 with the aid of an apparatus 37 that is provided for placing the tread strip on the drum. The placed-on tread strip 38a covers the built-up bandage-like reinforcing means 30b.

Figure 10:
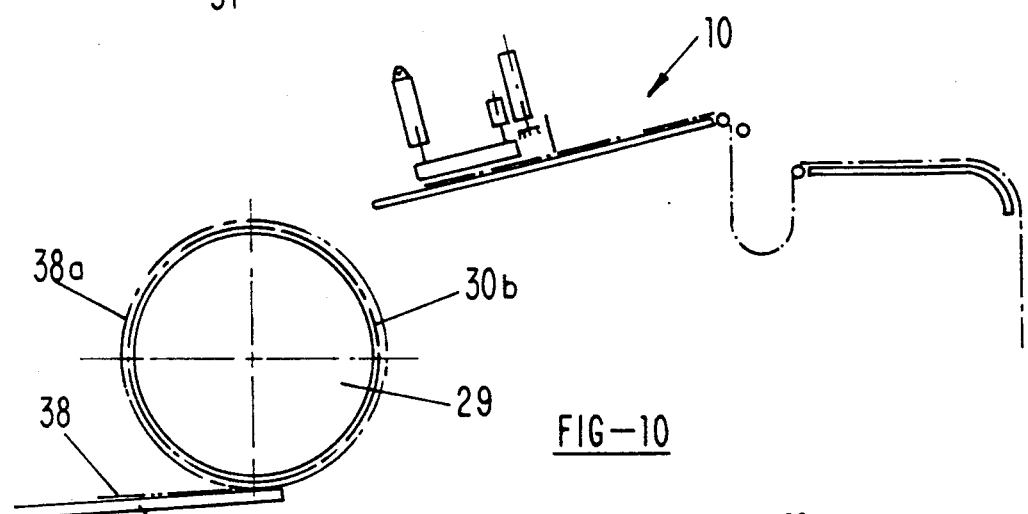
FIG. 10 shows the apparatus of FIG. 3 in the starting position during the placement of the tread strip.
Figure 11:
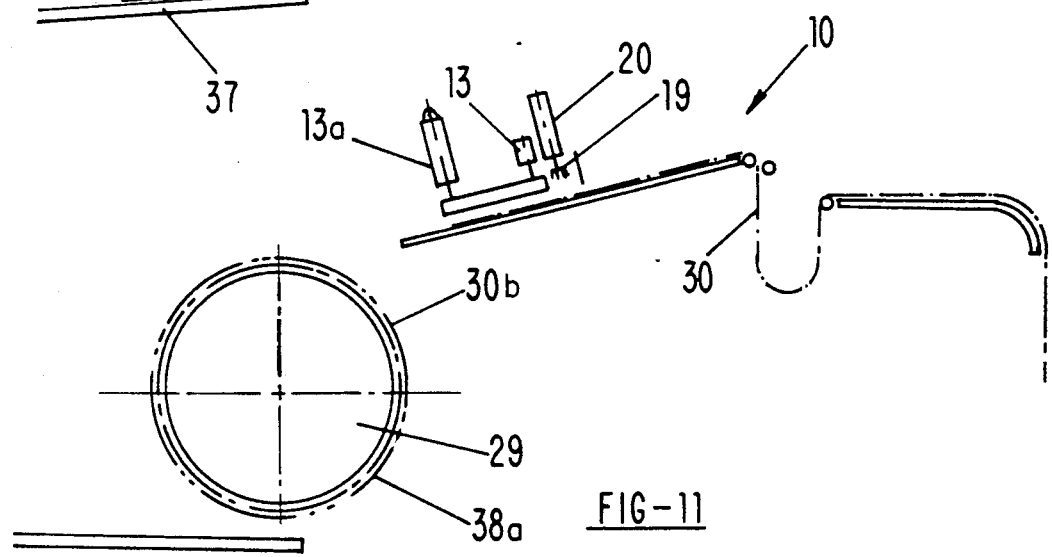
FIG. 11 shows the apparatus of FIG. 10 with the tread strip applied and in the bonding position, and with the feed apparatus of FIG. 3 in the starting position.

As shown in FIG. 10, the gripping and transporting apparatus 10 can be withdrawn while build-up of the tread strip 38 is being completed. The built-up tread 38a is similarly smoothed and evenly joined at its abutment edges. The built-up tread 38a is bonded to the previously built-up bandage-like reinforcing means 30b on the tire build-up drum 29. As shown in FIG. 11, the gripping and transporting apparatus 10 is returned to its starting position, and is available for a new operation.

The present invention is, of course, in no way restricted to the specific disclosure of the specification and drawings, but also encompasses any modifications within the scope of the appended claims.

What I claim is:

1. An apparatus for supplying a flexible component onto a curved surface, comprising:

a vacuum hose having suction means for gripping said flexible component from a feed means when a vacuum is applied to said vacuum hose, with a longitudinal extent of said vacuum hose extending along and at an angle to a longitudinal direction of said flexible component, and with said suction means of said vacuum hose including, as an integral part of said vacuum hose, a vacuum strip that is provided with a longitudinally extending suction chamber that communicates with a hollow space of said vacuum hose via holes; and lifting cylinder means disposed at opposite ends of said vacuum hose for raising, shifting and lowering said vacuum hose for placing same, and hence said flexible component, against a curved surface such that said vacuum hose and said flexible component conform to said curved surface.

2. An apparatus according to claim 1, which includes a longitudinally extending spiral spring that is disposed in said hollow space of said vacuum hose.

3. An apparatus according to claim 2, in which ends of said suction chamber of said vacuum strip of said vacuum hose are closed off by sealing strips that together with said vacuum strip form a common sealing surface.

4. An apparatus according to claim 3, in which said sealing strips extend at a predetermined angle relative to the longitudinal direction of said vacuum hose, with said angle corresponding to an angle of cut of said flexible component that is to be supplied.

5. An apparatus according to claim 4, in which said lifting cylinder means comprises lifting cylinders that are provided with lifting posts that are extendible to different lengths.

6. An apparatus according to claim 5, in which said lifting cylinders are held on a common support plate.

7. An apparatus according to claim 6, which includes guide means having a guide rail and a guide block, with said common support plate for said lifting cylinders being connected to said guide rail, which is movable in said guide block relative to said curved surface.

8. An apparatus according to claim 7, in which one of said lifting cylinders has associated therewith a pressing brush; and which includes a further lifting cylinder for raising and lowering said pressing brush relative to said flexible component.

9. An apparatus according to claim 8, in which said feed means includes a feed table for receiving said flexible component and supplying same to said curved surface; and in which said vacuum hose is disposed at a predetermined angle to a direction at which said feed table is supplying said flexible component.

10. An apparatus according to claim 9, in which said predetermined angle of said vacuum hose corresponds to an angle of cut of a cutting means that is associated with said feed table for cutting said flexible component to length.

11. An apparatus according to claim 1, which includes vacuum connection means for evacuating said vacuum hose.

* * * * *